United States Patent
Kaluskar et al.

(10) Patent No.: US 8,224,813 B2
(45) Date of Patent: Jul. 17, 2012

(54) COST BASED ANALYSIS OF DIRECT I/O ACCESS

(75) Inventors: Sanjay Kaluskar, Menlo Park, CA (US); Varun Malhotra, Palo Alto, CA (US); Tirthankar Lahiri, Palo Alto, CA (US); Juan Loaiza, Woodside, CA (US); Sumanta Chatterjee, Fremont, CA (US); Dmitry Potapov, Emerald Hills, CA (US); Margaret Susairaj, Sunnyvale, CA (US); Hakan Jakobsson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 716 days.

(21) Appl. No.: 11/584,255

(22) Filed: Oct. 20, 2006

(65) Prior Publication Data

US 2008/0098169 A1    Apr. 24, 2008

(51) Int. Cl.
G06F 7/00 (2006.01)
G06F 17/30 (2006.01)
G06F 12/00 (2006.01)
G06F 13/00 (2006.01)
G06F 13/28 (2006.01)

(52) U.S. Cl. .................................... 707/719; 711/117
(58) Field of Classification Search .................. None
See application file for complete search history.

(56) References Cited

U.S. PATENT DOCUMENTS

| | | | |
|---|---|---|---|
| 6,438,541 B1* | 8/2002 | Witkowski | 707/4 |
| 6,928,607 B2 | 8/2005 | Loaiza et al. | |
| 6,952,664 B1 | 10/2005 | Lahiri et al. | |
| 6,957,211 B1 | 10/2005 | Tyulenev et al. | |
| 7,103,608 B1 | 9/2006 | Ozbutun et al. | |
| 7,194,589 B2 | 3/2007 | Lahiri et al. | |
| 7,231,564 B2 | 6/2007 | Loaiza et al. | |
| 7,454,403 B2 | 11/2008 | Potapov et al. | |
| 7,467,279 B2 | 12/2008 | Lahiri et al. | |
| 7,493,465 B2 | 2/2009 | Susairaj et al. | |
| 7,526,508 B2 | 4/2009 | Tan et al. | |
| 2004/0220960 A1 | 11/2004 | Ojeil et al. | |
| 2004/0220961 A1 | 11/2004 | Lee et al. | |
| 2005/0010727 A1* | 1/2005 | Cuomo et al. | 711/138 |
| 2005/0044311 A1 | 2/2005 | Lahiri et al. | |
| 2005/0256976 A1 | 11/2005 | Susairaj et al. | |
| 2005/0273476 A1 | 12/2005 | Wertheimer et al. | |
| 2006/0190761 A1 | 8/2006 | Hu et al. | |
| 2007/0083641 A1 | 4/2007 | Hu et al. | |
| 2008/0097995 A1 | 4/2008 | Dias et al. | |
| 2008/0222311 A1 | 9/2008 | Lee et al. | |

(Continued)

OTHER PUBLICATIONS

Millsap, Why a 99%+ Database Buffer Cache Hit Ration is Not Ok, Dec. 2001,Hotsos Enterprises,13 pages.*

(Continued)

Primary Examiner — Kevin Ellis
Assistant Examiner — Gary W Cygiel
(74) Attorney, Agent, or Firm — Vista IP Law Group, LLP (57) ABSTRACT

A method, system, and computer program product for cost based analysis for data access in a database management system. In one approach, the method, system, and computer program product identifies data to access. A first cost for direct I/O storage access and a second cost for cache access are then determined for accessing the data. A comparison between the first cost and the second cost is then performed. Finally, a first portion of identified data is accessed based at least in part upon the comparison.

32 Claims, 6 Drawing Sheets

U.S. PATENT DOCUMENTS

2008/0235481 A1    9/2008    Baddepudi et al.

OTHER PUBLICATIONS

Hsu et al., Projecting the Performance of Decision Support Workloads on Systems with Smart Storage (SmartSTOR), Jun. 1999, UC Berkeley, 20 pages.*

FFE Software, SQL Tutorial, available as of Jan. 5, 2005, retrieved from Internet Archive at http://web.archive.org/web/20050105041733/http://www.firstsql.com/tutor5.htm on Apr. 6, 2009, 3 pages.*

Uysal et al., Structure and Performance of Decision Support Algorithms on Active Disks, 1998, USCB TRCS98-28, 24 pages.*

* cited by examiner

COST BASED ANALYSIS OF DIRECT I/O ACCESS

FIELD

Embodiments of the invention relate to accessing data in computer systems, and more particularly to a cost based analysis of direct I/O access.

BACKGROUND OF THE INVENTION

A cache is a collection of data that is a duplication of original values stored elsewhere or computed earlier when the original data is expensive to fetch or to compute relative to retrieval from the cache. Upon receipt of a data access request, the data may optionally be looked up in the cache as opposed to performing the fetch against the underlying storage, and the look up will result in either a cache hit (i.e. found in the cache) or a cache miss (i.e. not found in the cache). File, operating, and database management systems may use a cache to store frequently accessed data in order to avoid issuing Input/Output (I/O) requests to read and write the data from the underlying storage.

In particular, database management systems may employ the use of a database buffer cache in addition to the cache available from an operating system. The database buffer cache stores the data from the database, a collection of data stored on one or more disks, in order to service database requests without the I/O read and write costs. The underlying storage used by a file system or a database system may take on many forms including but not limited to one or more disk drives on a network. Generally, accessing data through the cache requires less I/O requests to storage options (e.g. disk drives) thereby reducing the time for retrieval of the data.

In some cases, it may be beneficial to access the underlying data storage directly by issuing I/O requests against the storage instead of accessing the data through the cache. For example, accessing an infrequently referenced table of a database through the cache may not reduce the response time for data retrieval because the I/O request may not be avoided if the table is not in the cache. Moreover, the placement in the cache of an infrequently accessed large table may require removal of more frequently accessed data and result in overall poor response time for the database. Therefore, a choice must be made between accessing the data using the cache or accessing the I/O storage by issuing I/O requests against the storage.

SUMMARY OF THE INVENTION

A method, system, and computer program product is described for cost based analysis for data access in a database management system. According to some embodiments, the system, method, and computer program product performs by identifying data to access, determining a first cost for direct I/O storage access and a second cost for cache access, performing a comparison between the first cost and the second cost, and accessing a first portion of identified data based upon the comparison.

For one or more embodiments, a method, system, and computer program product is described for cost based analysis for data access in a computing system with a smart storage device for identifying data to access, determining a first cost of direct I/O storage access with the smart storage, performing a comparison between a second cost for a cache access and the first cost, and accessing data based on the comparison.

In one or more embodiments, a computer program product is described for a computer usable medium having executable code to execute a process for implementing cost based analysis for data access in a computing system. The process describes implementing cost based analysis identifying data to access, determining a first cost for direct I/O storage access and a second cost for cache access, performing a comparison between the first cost and the second cost, and accessing a first portion of identified data based upon the comparison.

BRIEF DESCRIPTION OF THE DRAWINGS

The invention is illustrated by way of example and not limitation in the figures of the accompanying drawings, in which like references indicate similar elements and in which.

DETAILED DESCRIPTION

Embodiments of the present invention provide methods, systems and mediums for implementing a cost based analysis of direct I/O access.

Figure 1:
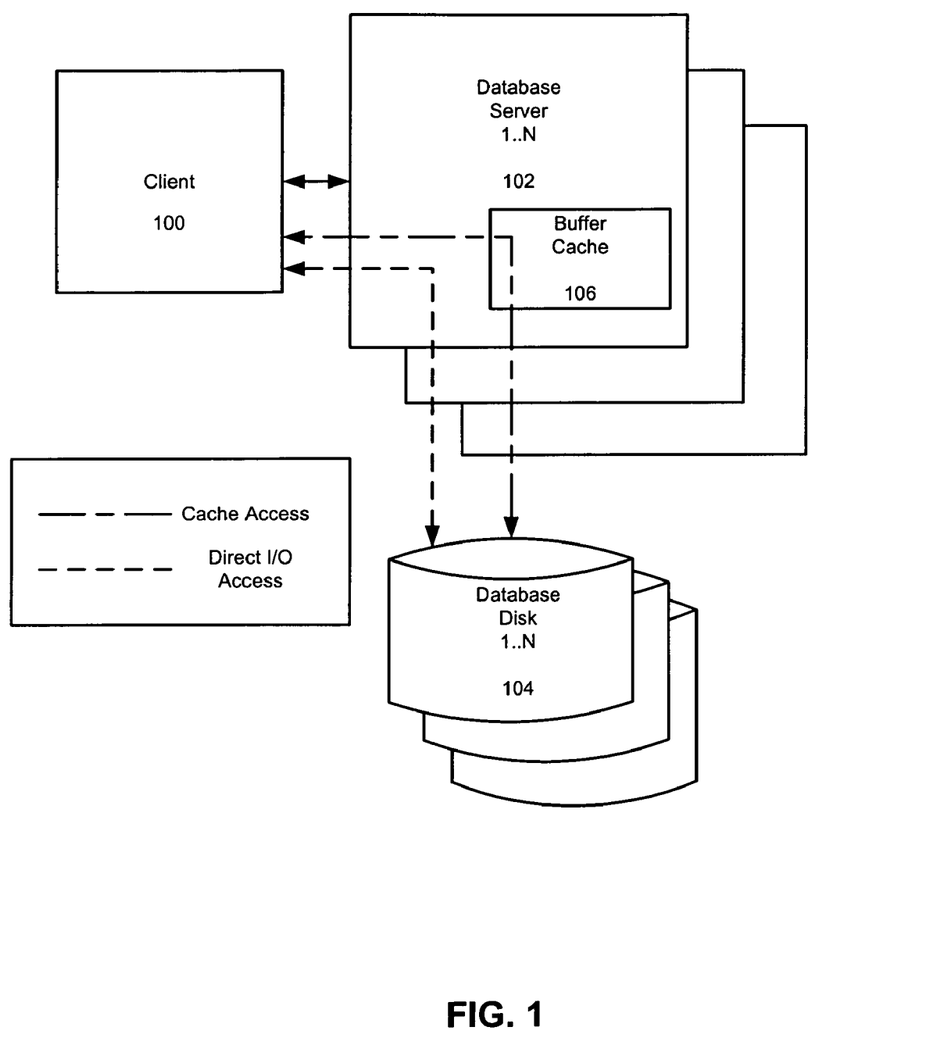
FIG. 1 is a block diagram of a system to implement a heuristic approach.

FIG. 1 is a block diagram of a system that illustrates the components used by a heuristic approach to identify particular candidates (e.g. an infrequently accessed table) for direct I/O access. In FIG. 1, Client 100 makes a database request to any of Database Servers 1 . . . N 102 that may either access a Database Disk 1 . . . N 104, storage for a collection of data, or a Buffer Cache 106 of a Database Server 1 . . . N 102. The Database Servers 1 . . . N 102 are running instances of the database management system software. If a Database Server 1 . . . N 102 determines prior to execution that the database request involves an infrequently accessed table, then a Database Server 1 . . . N 102 can access a Database Disk 1 . . . N 104 directly. Similarly, heuristic approaches can be used for database requests that involve the execution of parallel queries, queries that allow a user to break-up a given Structured Query Language (SQL) statement so that the parts can run simultaneously.

However, the heuristic approaches may miss direct I/O access candidates because the heuristics are based on a small subset of factors that result in identification of only the extreme cases prior to execution (e.g. large infrequently accessed tables not in the cache). There is a need for a more comprehensive strategy to identify direct I/O access candidates. In particular, the comprehensive strategy may account for the effect of data distribution, the content of a data access request, the composition of local and remote caches, and provide reevaluation during runtime to determine whether to access the data with the cache or directly access the disk.

Figure 2:
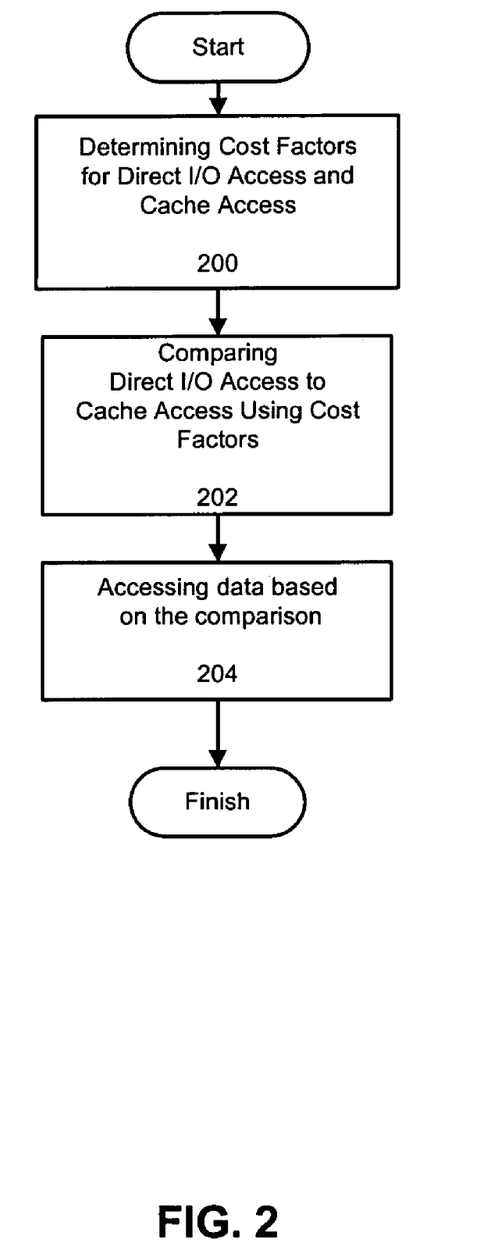
FIG. 2 is a flowchart of a process for cost based analysis of direct I/O access.

FIG. 2 is a flowchart of a process for cost based analysis of direct I/O access. Initially, cost factors are determined for direct I/O access and cache access (200). Some cost factors may change during repeated data access to fulfill an access request, and therefore, reevaluation of some factors after the initial data access decision may be beneficial. In one or more embodiments, some examples of factors that may be considered are: a number of blocks in a cache instance that have not been written to disk, a number of data blocks that must be accessed, a number of cached blocks on a cache instance, a number of blocks distributed across other cache or disk instances, an I/O time per block for direct I/O access, an I/O time per block for accessing the cache, and a time to transfer a block to another cache or disk instance. Cost factors may be weighted in accordance with the system or access request. For example, one or more embodiments may incorporate a reduction in the amount of data to read from disk due to filtering on the disk and local projection available with smart storage options. In some embodiments, there is no reduction in the amount of data to read from disk because a full table scan is desired. Next, a comparison is done between a cost for direct I/O access to a cost for cache access (202). Data is accessed on the basis of the comparison (204) either from the direct I/O access to the underlying storage or the cache.

Figure 3:
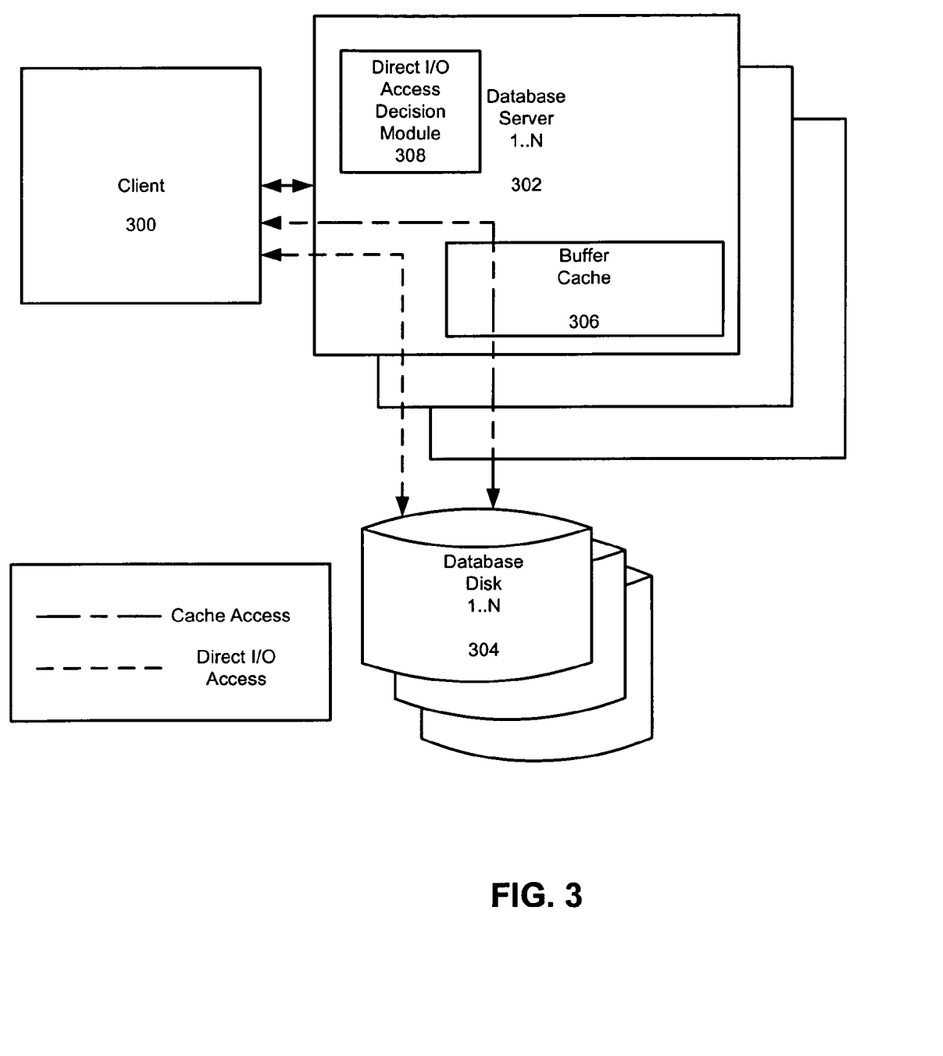
FIG. 3 is a block diagram of an architecture for implementing the cost based analysis of direct I/O access.

FIG. 3 is a block diagram of an architecture for implementing the cost based analysis of direct I/O access. Client 300 may make a database request to any of the Database Servers 1 . . . N 302. In one or more embodiments, the Database Servers 1 . . . N 302 are a clustered database. Database management systems may be implemented as a cluster with multiple instances of the database management software running simultaneously on multiple computers to handle database requests while accessing a single database. A cluster is a group of computers that work together so that in many respects they can be viewed as though they are a single computer. With a clustered database, the database buffer caches on each computer may operate as a single, global cache to ensure that all instances of the database management system software have access to the cached data to handle database requests.

Continuing with FIG. 3, to fulfill a portion of a database request, a Database Server 102 will either access one of the Database Disks 1 . . . N 304 or the Buffer Cache 306 of a Database Server 1 . . . N 302. The Direct I/O Access Decision Module 308 is used by a Database Server 1 . . . N 302 to determine whether to access data from the Buffer Cache 306 or the Database Disk 304. Although a client server architecture for a database is included for illustration purposes in FIG. 3, those skilled in the art will appreciate that many architectures are available for implementing the cost based analysis of direct I/O access.

Figure 4:
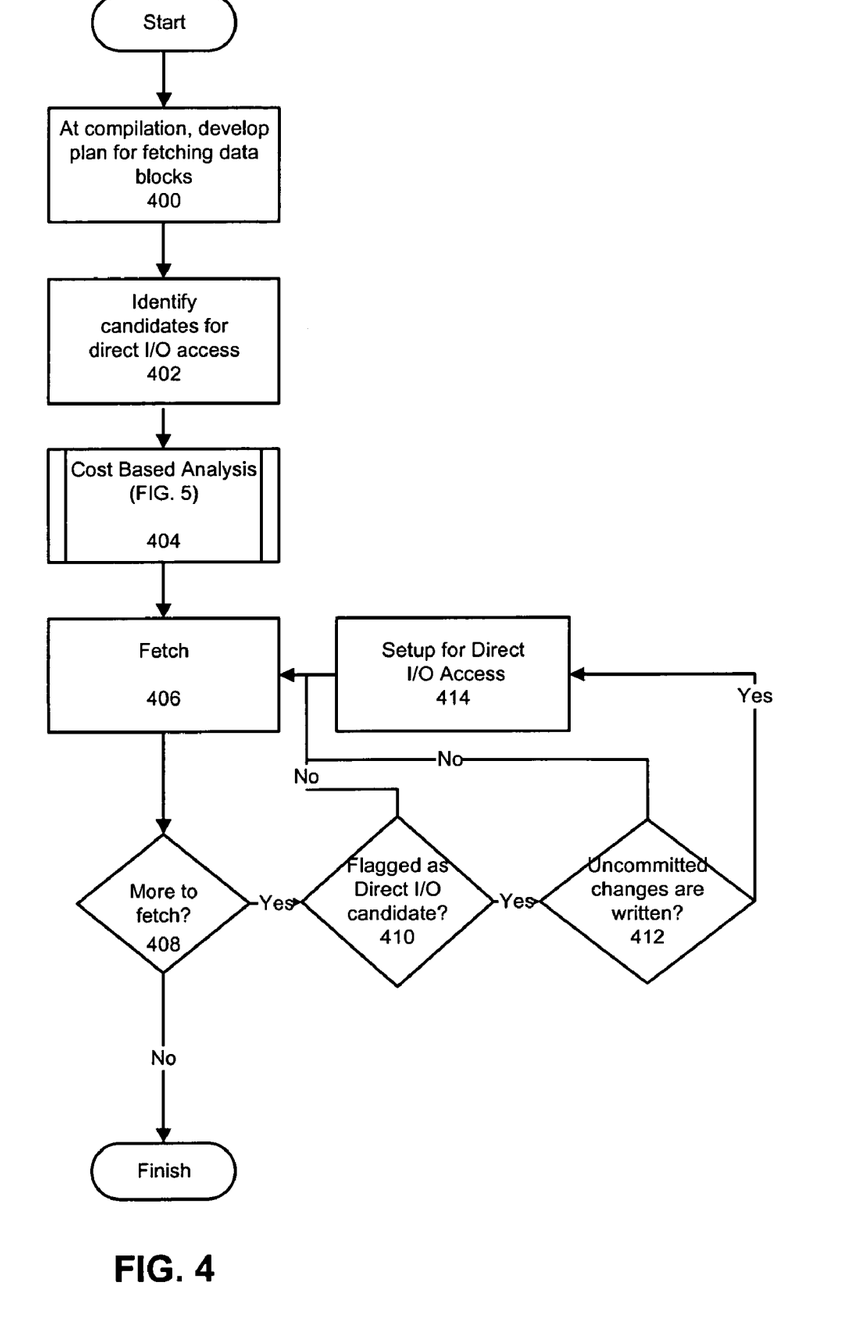
FIG. 4 is a flowchart for an implementation of a cost based analysis of direct I/O access.

FIG. 4 is a flowchart for an implementation of a cost based analysis of direct I/O access. At compilation, a plan is developed for fetching data blocks (400) to fulfill a request for data. Although the implementation is described in reference to the use of data blocks, those skilled in the art will recognize that data may be accessed with the use of any suitable data storage unit. In one or more embodiments, a plan is developed by a Database Server 302 from a database request received from a Client 300 with a SQL query to be executed against the database. Upon receipt of the database request and during compilation, candidates for direct I/O access can be identified (402) in order to eliminate obviously wrong candidates for direct I/O access. For example, embodiments of a cost based analysis of direct I/O access may prefer to perform cost based analysis only on queries that involve full table scans, accessing the entire table. After identification of candidates (402), cost based analysis may be performed (404) and is described in detail with FIG. 5.

Figure 5:
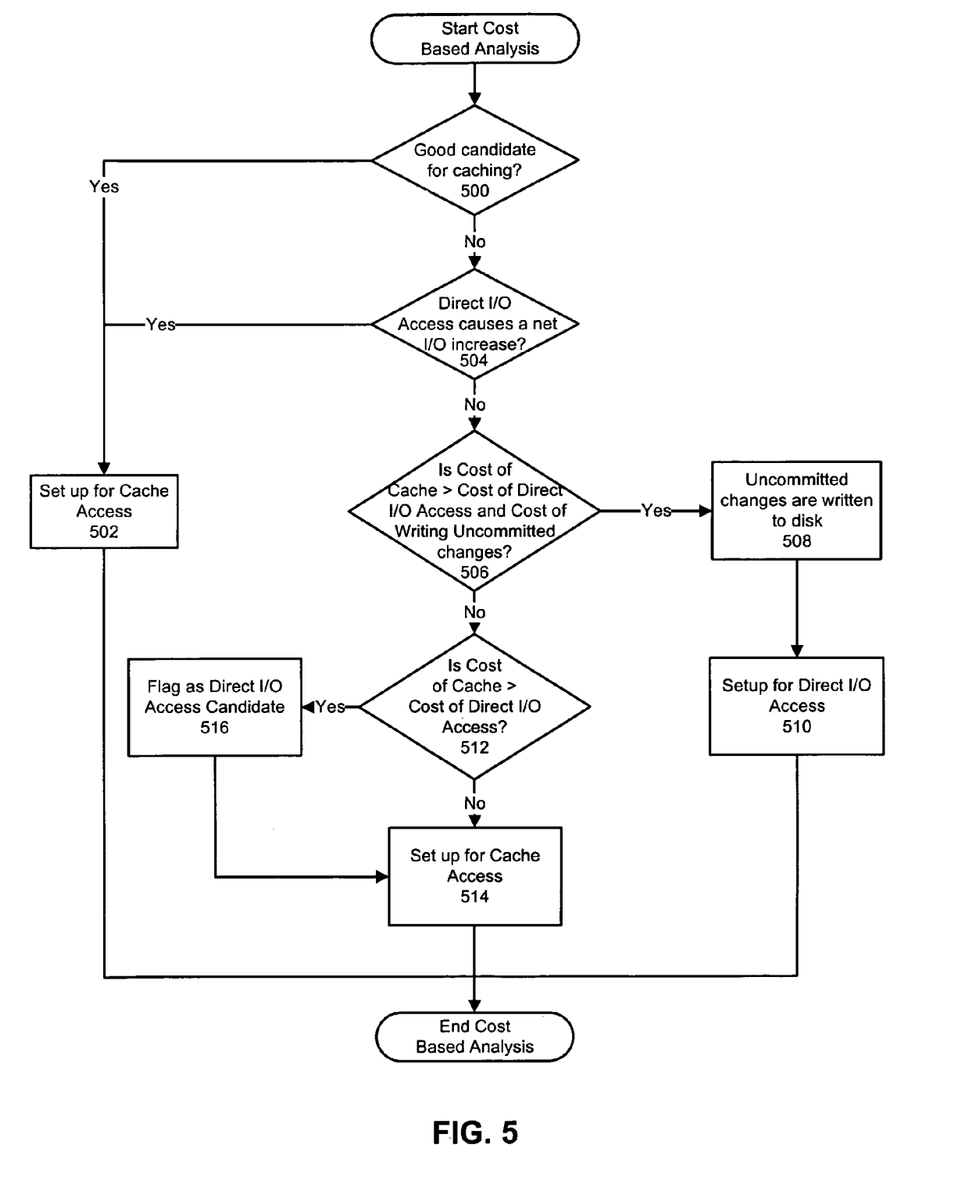
FIG. 5 is a flowchart of an embodiment for cost based analysis.

FIG. 5 is a flowchart of an embodiment for cost based analysis. Initially, a determination may be made as to whether an underlying table to be accessed in the query is a good candidate for caching (500). For example, in one or more embodiments, a candidate determination may be made on the basis of the size of the cache, whether a table is frequently accessed or accessed recently such that at least a portion is in a cache to access. If it is determined that the query involves a good candidate for caching (500), then set up is done to allow for cache access (502) and cost based analysis is terminated. Alternatively, if the data to be accessed is not a good candidate for caching (500), then a determination may be made as to whether direct I/O access causes a net increase in I/O cost (504). In one or more embodiments, an overall check in view of the performance of the whole system may be advisable to avoid bottlenecks that can occur in the system with heavy use of direct I/O access. If the direct I/O access would result in a net increase in I/O cost, then set up is done to allow for cache access (502) and the cost based analysis is terminated.

Continuing with FIG. 5, alternatively, if direct I/O access is found not to cause a net increase in I/O cost (504), then the total cost of cache access is compared to the total cost of direct I/O access that may take into account a cost to write the blocks of uncommitted database changes to disk (506). Some systems may write uncommitted data to disk to avoid having out of date data on the disk, and in such systems, the cost of writing uncommitted data may need to be considered in the determining cost of direct I/O. Many factors contribute to calculating a total cost of cache access, direct I/O access and writing blocks of uncommitted database changes to disk. Optional factors that may be considered are: the number of dirty blocks for a table on an instance, a number of table blocks, a number of current cached table blocks on a particular instance, a number of table blocks distributed across other instances, a reduction in the amount of data to read due to predicate pushing and/or projection, time per block for direct I/O access, time per block for I/O done through the cache, and time to transfer a block from another instance.

In calculating a cost of accessing the data through the cache, the cost of placing data into the cache from local and remote caches may be considered. In one or more embodiments, a total cost of cache access (e.g. total cost to read from the cache) determined by: $[N_{tdist}*(K_x-K_c)+(N_t-N_{tcache})*K_c]*T_{diob}$, where $N_{tdist}$ is a number of table blocks distributed on other instances, $K_x$ is a ratio of a cost for transfer of data between cache instances to a cost for direct I/O access, $K_c$ is a ratio of a cost for access of a cache to cost for direct I/O access, $N_t$ is a number of table blocks to be accessed, $N_{tcache}$ is a number of cached table blocks on the current instance, and $T_{diob}$ is an I/O time per block for direct I/O. In some embodiments, $N_t$ could be some or all of the table blocks associated with a table.

To calculate a cost of direct I/O access, the cost of reading the data from disk may be considered. In one or more embodiments, a cost of direct I/O access is determined by: $T_{diob}*N_t$, where $T_{diob}$ is an I/O time per block for direct I/O and $N_t$ is a number of table blocks. Factors may be weighted to account for the system or data access request variables. For example, if smart storage is available for predicate pushing to filter a data transfer to a local disk on the basis of a predicate (e.g. for the query "select * from employee_table where name='scott';", "name=scott" is the predicate) when a query accesses disk, then the number of table blocks considered for the total cost of a direct I/O access may be reduced. Smart storage may also provide the ability to do projections when a query accesses disk. For example, in "select employee_id from employee_table;", smart storage may reduce the amount of data sent back from disk by a large factor, by only sending one or a few columns out of all the columns for each row. In one or more embodiments, a cost of direct I/O access is determined by: $T_{diob}*N_t*R$, where $T_{diob}$ is an I/O time per block for direct I/O, $N_t$ is a number of table blocks, and R is a reduction factor that can be applied to the cost of direct I/O access to account for smart storage.

To calculate a cost for writing uncommitted changes, the cost of writing all the uncommitted changes from multiple instances may be considered if the data is distributed. If the data is distributed across instances, then the data can be written in parallel and the dominant cost becomes the cost for writing data from the instance with the most data to write. In one or more embodiments, a cost of writing uncommitted changes to disk is determined by: Max $\{N_{db}(i)\}*K_c*T_{diob}$, where Max $\{N_{db}(i)\}$ is a maximum number of uncommitted blocks of data to a disk, $K_c$ is a ratio of a cost for access of a cache to cost for direct I/O access, and $T_{diob}$ is an I/O time per block for direct I/O.

Continuing with FIG. 5, if the cost of cache access is greater than a cost of direct I/O access and a cost of writing uncommitted changes to disk (506), then the uncommitted changes are written to disk (508). After the uncommitted changes are written to disk, set up is begun to use direct I/O access for the query (510) and cost analysis is terminated.

Alternatively, if the cost of cache access is less than the cost of direct I/O access and the cost of writing uncommitted changes (506), then a comparison is done between the cost of cache access and the cost of direct I/O access (512). If the cost of cache access is less than the cost of direct I/O access (512), then setup is begun for cache access (514). Alternatively, if the cost of cache access is greater than the cost of direct I/O access (512), then the query is flagged as a direct I/O access candidate (516). By flagging the query as a direct I/O access candidate (516), the access method may be reevaluated during execution of the query (e.g. while table blocks are fetched). After flagging the query as a direct I/O candidate (516), setup for accessing the cache (514) is done and cost based analysis is terminated.

Continuing with FIG. 4, upon return from the cost based analysis (404), a block of data is fetched (406) using the method determined from the cost based analysis (404). If there are no more data blocks to fetch (408), then the process cost based analysis for direct I/O access is terminated. Alternatively, if there are more data blocks to fetch (408), then the flag as to whether the request involves a direct I/O candidate is checked (410). In one or more embodiments, if the there are more data blocks to fetch (408), then a cost based analysis is performed again (404). If the request is not flagged as a direct I/O access candidate (410), then another data block is fetched (406) and the steps are repeated with (408).

Alternatively, if the request is flagged as a direct I/O access candidate (410), then a determination is made as to whether the relevant uncommitted changes are written to the disk (412). If the uncommitted changes are not written to disk, then a data block is fetched (406) and the steps are repeated. Alternatively, if the uncommitted changes are written to disk (412), then direct I/O access is setup (414). Next, a data block is fetched (406) and the steps are repeated until all data blocks are fetched.

System Architecture

Figure 6:
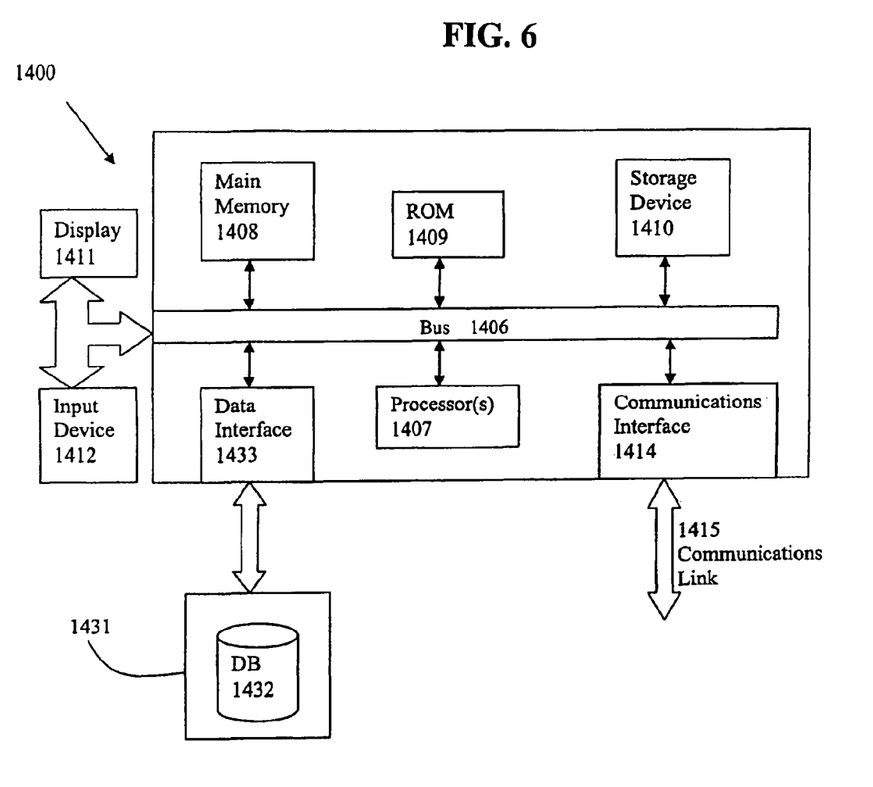
FIG. 6 is an architecture for support of an implementation of a cost based analysis of direct I/O access.

The execution of the sequences of instructions required to practice the embodiments may be performed by a computer system 1400 as shown in FIG. 6. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 6, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Logic refers to software, hardware or any combination of software and hardware.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A computer-implemented method of cost based analysis for fetching data in a database management system, comprising:
   identifying data to fetch;
   in response to the act of identifying the data to fetch, determining a first cost for a direct I/O storage access and a second cost for a cache access;
   performing, by using a processor, a comparison between the first cost and the second cost;
   fetching a first portion of the data based at least in part upon the comparison, in which a determination is made for whether a cache access to read a first portion of the data should be performed, and if the determination is made that the first portion of the data should be read without the cache access to read the first portion of the data, then performing direct I/O storage access to read the first portion of the data without looking up the data in the cache; and
   storing the first portion in a volatile or non-volatile computer usable medium or displaying the first portion on a display device.

2. The method of claim 1, wherein the comparison determines whether the first portion of identified data is accessed using a direct I/O storage access.

3. The method of claim 1, wherein the second cost for cache access is a cost for a database buffer cache access.

4. The method of claim 1, wherein the first cost for direct I/O storage access further comprises determining a cost of writing uncommitted database changes to a disk.

5. The method of claim 1, further comprising:
   determining one or more cost factors for the first cost and the second cost; and
   determining a weight to be applied to at least one of the one or more cost factors.

6. The method of claim 5, wherein the weight to be applied is dependent on whether the database management systems uses a smart storage device.

7. The method of claim 5, wherein the one or more cost factors further comprises a cost to access a storage unit of data directly from I/O storage and a number of storage units of data to access from I/O storage.

8. The method of claim 5, wherein the one or more cost factors further comprises a maximum number of uncommitted storage units of data to write to a disk and a ratio of a cost for access of a cache to a cost for a direct I/O storage access.

9. The method of claim 5, wherein the one or more cost factors further comprises a number of storage units of data distributed on remote cache instances, a ratio of a cost for transfer of data between cache instances to a cost for direct I/O access, a ratio of a cost for access of a cache to cost for direct I/O access, a number of storage units of data, a number of cached storage units of data on a local instance, and an I/O time per storage unit of data for direct I/O.

10. The method of claim 5, wherein the weight to be applied is dependent on a projection capability of a smart storage device.

11. The method of claim 5, wherein the weight to be applied is dependent on a predicate pushing capability of a smart storage device.

12. The method of claim 1, further comprising:
   determining whether a database request involves a direct I/O storage access candidate;
   determining whether a set of uncommitted changes relevant to the database request are written to disk; and
   accessing a second portion of the identified data based upon the database request and the set of uncommitted changes.

13. The method of claim 1, further comprising:
   determining a plan to fetch one or more data blocks in response to a database request, wherein the first portion of identified data is a first data block in the plan.

14. The method of claim 13, further comprising:
   comparing the first cost and the second cost for a second portion of identified data, wherein the second portion of identified data is a second data block in the plan.

15. The method of claim 1, wherein the database management system manages a clustered database.

16. A computer-implemented method for cost based analysis for data access in a computing system with a smart storage device, comprising:
   identifying data to fetch;
   in response to the act of identifying the data to fetch, determining a first cost of a direct I/O storage access with the smart storage, wherein the smart storage provides the ability to do predicate pushing and projections such that an amount of data read may be reduced;
   performing, by using a processor, a comparison between a second cost for a cache access and the first cost of the direct I/O storage access with the smart storage;
   fetching the data based at least in part upon the comparison, in which a determination is made for whether a cache access to read the data should be performed, and if a determination is made that the data should be read without the cache access to read the data, then performing direct I/O storage access to read the data without looking up the data in the cache; and storing the data in a volatile or non-volatile computer usable medium or displaying the data on a display device.

17. The method of claim 16, further comprising:

determining one or more cost factors for the first cost and the second cost; and determining a weight to be applied to at least one of the one or more cost factors.

18. The method of claim 17, wherein the one or more cost factors further comprises a cost to access a storage unit of data directly from I/O storage and a number of storage units of data to access from I/O storage.

19. The method of claim 17, wherein the weight to be applied is dependent on a projection capability of the smart storage device.

20. The method of claim 17, wherein the weight to be applied is dependent on a predicate pushing capability of the smart storage device.

21. A computer program product comprising a volatile or non-volatile computer usable storage medium having executable code by using a processor to execute a process for implementing cost based analysis for fetching data in a computing system, the process comprising:

identifying data to fetch;

in response to the act of identifying the data to fetch, determining a first cost for a direct I/O storage access and a second cost for a cache access;

performing a comparison between the first cost and the second cost;

fetching a first portion of the data based at least in part upon the comparison, in which a determination is made for whether a cache access to read the first portion of the data should be performed, and if the determination is made that the first portion of the data should be read without the cache access to read the first portion of the data, then performing direct I/O storage access to read the first portion of the data without looking up the data in the cache; and storing the first portion in a volatile or non-volatile computer usable medium or displaying the first portion on a display device.

22. The product of claim 21, further comprising:

determining one or more cost factors for the first cost and the second cost; and determining a weight to be applied to at least one of the one or more cost factors.

23. A system for cost based analysis for fetching data, comprising:

a database server for identifying data to fetch;

a database cache for the database server to access data and a database I/O storage for the database server to access data, wherein the database server determines a first cost for a direct I/O storage access and a second cost for a cache access in response to the act of identifying the data to fetch;

a direct access I/O decision module for performing a comparison between the first cost and the second cost, in which a determination is made for whether a cache access to read a first portion of the data should be performed, and if the determination is made that the first portion of the data should be read without the cache access to read the first portion of the data, then the database server performs direct I/O storage access to read the first portion of the data without looking up the data in the cache; and a volatile or non-volatile computer usable medium for storing the first portion or a display device for displaying the first portion.

24. The system of claim 23, wherein the comparison determines whether the first portion of identified data is accessed using a direct I/O storage access.

25. The system of claim 23, wherein the second cost for cache access is a cost for a database buffer cache access.

26. The system of claim 23, wherein the first cost for direct I/O storage access determines a cost of writing uncommitted database changes to a disk.

27. The system of claim 23, wherein a direct access I/O decision module determines one or more cost factors for the first cost and the second cost, and a weight to be applied to at least one of the one or more cost factors.

28. The system of claim 27, wherein the weight to be applied is dependent on whether the database management systems uses a smart storage device.

29. A computer program product comprising a volatile or non-volatile computer usable storage medium having executable code by using a processor to execute a process for implementing cost based analysis for data access in a computing system, the process comprising:

identifying data to fetch;

in response to the act of identifying the data to fetch, determining a first cost of a direct I/O storage access with a smart storage, wherein the smart storage provides the ability to do predicate pushing and projections such that an amount of data read may be reduced;

performing a comparison between a second cost for a cache access and the first cost of the direct I/O storage access with the smart storage;

fetching the data based at least in part upon the comparison, in which a determination is made for whether a cache access to read the data should be performed, and if a determination is made that the data should be read without the cache access to read the data, then performing direct I/O storage access to read the data without looking up the data in the cache; and storing the data or displaying the data on a display device.

30. The product of claim 29, further comprising:

determining one or more cost factors for the first cost and the second cost; and determining a weight to be applied to at least one of the one or more cost factors.

31. A system for cost based analysis comprising:

a database server for identifying data to fetch;

a database cache for the database server to access data and a database I/O storage for the database server to access data, wherein the database server determines a first cost of a direct I/O storage access with a smart storage in response to the act of identifying the data to fetch, wherein the smart storage provides the ability to do predicate pushing and projections such that an amount of data read may be reduced;

a direct access I/O decision module for performing a comparison between a second cost for a cache access and the first cost of the direct I/O storage access with the smart storage, in which a determination is made for whether a cache access to read the data should be performed, and if a determination is made that the data should be read without the cache access to read the data, then the database server performs direct I/O storage access to read a first portion of the data without looking up the data in the cache; and a volatile or non-volatile computer usable medium storing the data or a display device displaying the data.

32. The system of claim 31, wherein the direct access I/O decision module is configured for:

determining one or more cost factors for the first cost and the second cost; and determining a weight to be applied to at least one of the one or more cost factors.

* * * * *